US009765557B2

(12) United States Patent
Lecot

(10) Patent No.: US 9,765,557 B2
(45) Date of Patent: Sep. 19, 2017

(54) SLIDING DOOR GUIDE AND AN ASSEMBLY COMPRISING SUCH A GUIDE

(71) Applicant: Fermod, Senlis (FR)

(72) Inventor: Francis Lecot, Glaignes (FR)

(73) Assignee: Fermod, Senlis (FR)

( * ) Notice: Subject to any disclaimer, the term of this patent is extended or adjusted under 35 U.S.C. 154(b) by 0 days.

(21) Appl. No.: 14/843,998

(22) Filed: Sep. 3, 2015

(65) Prior Publication Data

US 2016/0076290 A1    Mar. 17, 2016

(30) Foreign Application Priority Data

Sep. 11, 2014 (FR) ...................... 14 58556

(51) Int. Cl.
| | | |
|---|---|---|
| E05D 15/06 | (2006.01) | |
| E05D 15/56 | (2006.01) | |
| E06B 3/46 | (2006.01) | |
| F16C 29/00 | (2006.01) | |
| F25D 23/02 | (2006.01) | |
| E05D 15/10 | (2006.01) | |

(52) U.S. Cl.
CPC ..... *E05D 15/0604* (2013.01); *E05D 15/0656* (2013.01); *E05D 15/565* (2013.01); *E06B 3/46* (2013.01); *F16C 29/005* (2013.01); *E05D 15/1021* (2013.01); *E05Y 2201/64* (2013.01); *E05Y 2600/11* (2013.01); *E05Y 2800/407* (2013.01); *E05Y 2900/102* (2013.01); *F25D 23/021* (2013.01)

(58) Field of Classification Search
CPC ............... F25D 23/021; E05D 15/1021; E05D 15/0656; E05D 2015/106; E05D 15/565
See application file for complete search history.

(56) References Cited

U.S. PATENT DOCUMENTS

| | | | | |
|---|---|---|---|---|
| 3,318,048 | A * | 5/1967 | Odend Hal ........... | E05D 15/565 49/223 |
| 3,412,507 | A * | 11/1968 | Sterner ............... | E05D 15/1021 49/212 |
| 4,680,828 | A * | 7/1987 | Cook .................. | E05D 15/0634 16/102 |

(Continued)

FOREIGN PATENT DOCUMENTS

| | | |
|---|---|---|
| DE | 32 39 127 A1 | 4/1984 |
| WO | 89/04415 A1 | 5/1989 |
| WO | 03/052226 A2 | 6/2003 |

OTHER PUBLICATIONS

Rapport de Recherche Préliminaire, FR 14 58556, May 7, 2015.

*Primary Examiner* — Katherine Mitchell
*Assistant Examiner* — Catherine A Kelly
(74) *Attorney, Agent, or Firm* — Soquel Group LLC

(57) ABSTRACT

A sliding door guide, including a rail designed to be fastened against a vertical panel, the rail extending along a longitudinal axis, and a carriage designed to be fastened to the door, the carriage being provided with means for sliding along the rail, the sliding means including a stop opposing the movement of the carriage relative to the rail in a direction perpendicular to the longitudinal axis, wherein the stop can deform elastically under the effect of a force in the direction perpendicular to the longitudinal axis, so as to allow a separation between the carriage and the rail.

6 Claims, 5 Drawing Sheets

(56) References Cited

U.S. PATENT DOCUMENTS

| | | | | |
|---|---|---|---|---|
| 5,301,468 A | * | 4/1994 | Kamezaki | E05D 15/1021 49/209 |
| 5,566,505 A | * | 10/1996 | Kamezaki | E05D 15/1021 49/209 |
| 6,336,248 B1 | * | 1/2002 | Finkelstein | E05D 15/1021 16/87.4 R |
| 7,117,637 B2 | * | 10/2006 | Delgado | E05D 15/063 49/141 |
| 7,222,457 B2 | * | 5/2007 | Delgado | E05D 15/0621 16/87.4 R |
| 7,367,159 B2 | * | 5/2008 | Delgado | E05D 15/0652 49/116 |
| 7,757,437 B2 | * | 7/2010 | Schulte | E05D 15/0626 49/116 |

* cited by examiner

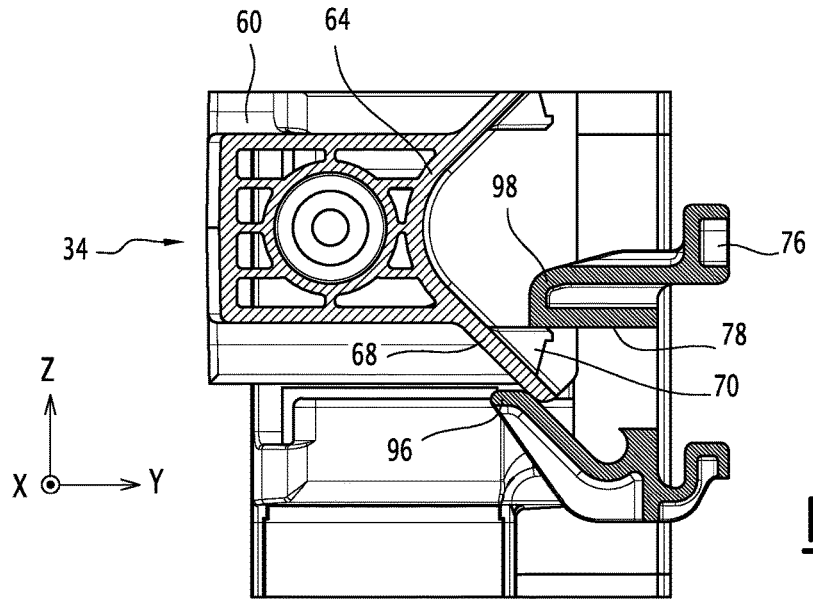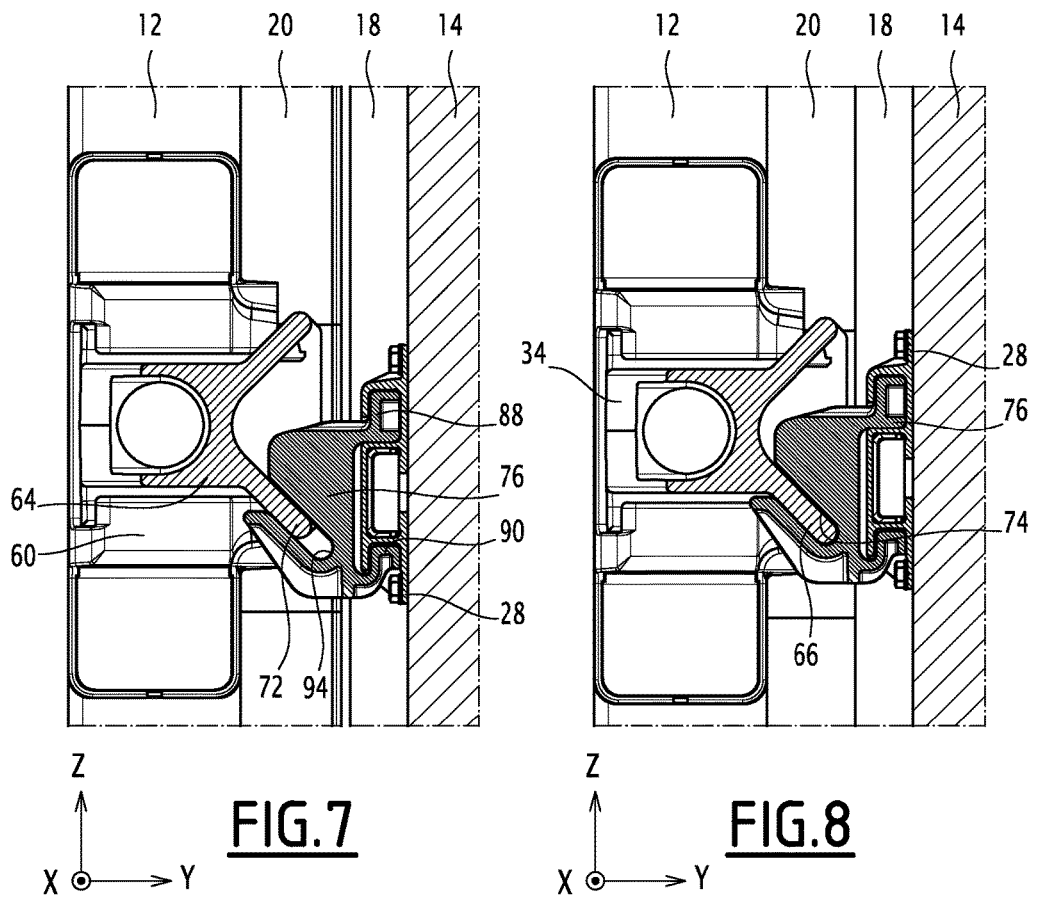

SLIDING DOOR GUIDE AND AN ASSEMBLY COMPRISING SUCH A GUIDE

The present invention relates to a sliding door guide, including:
a rail designed to be fastened against a vertical panel, the rail extending along a longitudinal axis, and
a carriage designed to be fastened to the door, the carriage being provided with means for sliding along the rail, the sliding means comprising a stop opposing the movement of the carriage relative to the rail in a direction perpendicular to the longitudinal axis.

The invention in particular applies to so-called tight sliding doors, in particular in the field of cold rooms intended for the agri-food sector.

Such sliding doors comprise sealing gaskets that must be pressed against the doorframe of a panel of the room, or against the floor of the room, when the door is in the closed position.

Such sliding doors are in particular known from documents FR 2,982,897 A1 and FR 2,936,005 A1.

The sliding doors generally have a translation device, situated in the upper part of the door, as well as a guide situated on the floor or in the lower part of the door. The guide accompanies the sliding of the door and the pressing of the sealing gaskets in the closed position.

However, this type of door is frequently located in handling zones where heavy vehicles move. The doors therefore regularly absorb relatively significant impacts, in particular in their lower part. The guides situated at the bottom of the doors are therefore frequently damaged, in particular by frontal impacts on the doors.

The present invention provides a guide, in particular for the lower part of a sliding door, making it possible to limit or avoid deterioration in case of frontal impact on the door.

To that end, the invention relates to a guide of the aforementioned type, wherein the stop opposing a movement of the carriage relative to the rail can deform elastically under the effect of a force in the direction perpendicular to the longitudinal axis, so as to allow a separation between the carriage and the rail.

According to specific embodiments, the guide includes one or more of the following features, considered alone or according to any technically possible combinations:
the stop is formed by two opposite surfaces, one of the two surfaces being connected to the carriage and the other of two surfaces being connected to the rail;
the two surfaces are inclined relative to the vertical panel, by an angle comprised between 30° and 60°, and preferably close to 45°;
the sliding means comprise a pad fitted in the rail and able to slide along said rail, one of the two opposite surfaces of the stop being supported by the carriage and the other of the two opposite surfaces being supported by the pad;
the device further comprises a latch supported by an element from among the carriage and the pad, the latch being elastically fitted with a notch supported by the other element among the pad and the carriage, the latch and/or the notch being able to deform elastically under the effect of a force in a direction substantially perpendicular to the longitudinal axis; and
the two opposite surfaces are able to slide against one another in a direction perpendicular to the longitudinal axis.

The invention also relates to an assembly comprising a substantially vertical sliding door and a guide as described above, the carriage being fastened to a lower half of the sliding door.

According to particular embodiments, the assembly comprises one or more of the following features, considered alone or according to any technically possible combinations:
the assembly further comprises a translation device for the sliding door, connected to an upper part of the door;
the translation device comprises a second rail designed to be fastened against the vertical panel; a second carriage fastened to the sliding door and comprising means for sliding along the second rail;
the translation device defines a trajectory of the sliding door between a closed position and an open position, such that said door is closer to the panel and/or lower in the closed position than in the open position.

The invention will be better understood upon reading the following description, provided solely as a non-limiting example and done in reference to the drawings, in which:

FIG. 6 is a partial cross-sectional view of the guide of FIG. 1;

FIGS. 7 and 8 are partial cross-sectional views of the guide of FIG. 1, in two different positions.

Figure 1:
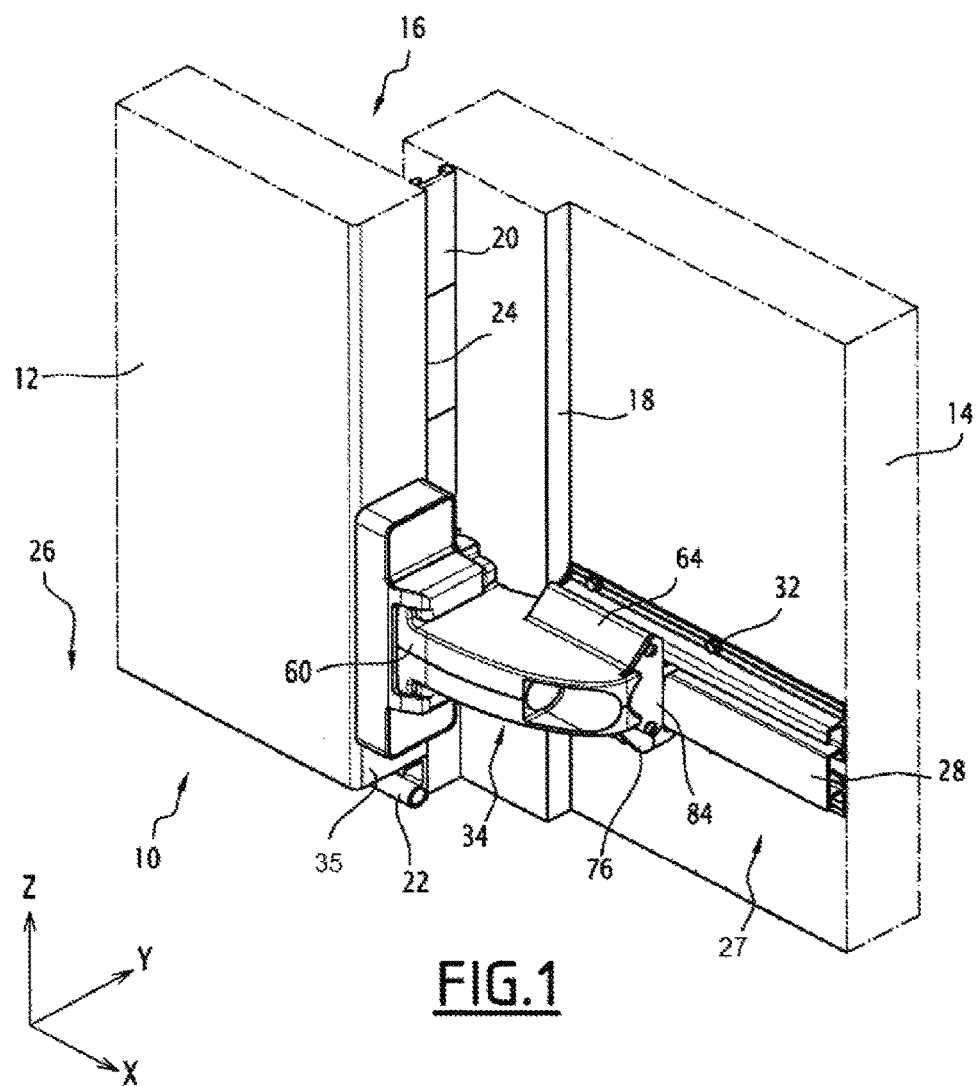
FIG. 1 is a perspective, partial sectional view of an assembly including a sliding door, a device for guiding the door and a translation device of the door, according to one embodiment of the invention, this view showing the door and the guide.

The assembly 10 shown in FIG. 1 includes a sliding door 12, substantially positioned in a vertical plane. A Cartesian reference (X, Y, Z) is considered, X being the longitudinal axis, Y being the transverse axis and Z being the vertical axis. The plane of the door 12 is parallel to (X, Z).

The door 12 is able to slide along the longitudinal axis X relative to a panel 14 parallel to (X, Z), so as to open and close an opening 16 arranged in the panel 14.

The opening 16 is delimited by a doorframe 18 secured to the panel 14. Seals 20, 22 are positioned near the edges 24 of a surface of the door 12 oriented toward the panel 14. In the closed position of the door 12, the seals 20, 22 are pressed against the doorframe 18, or against the floor 26 at the opening 16, said opening 16 thus being tightly obstructed.

The assembly 10 further includes a guide 27 for guiding the sliding door 12. In particular, the guide 27 is designed to guide a lower part of the door 12.

The guide 27 includes a first rail 28, extending along the longitudinal axis X. The rail 28 is fastened to the panel 14, on the side oriented toward the door 12. The rail 28 is for example fastened by screws 32.

The guide 27 also includes a first carriage 34 fastened to a lateral segment 35 of the door 12. Preferably, the first carriage 34 and the first rail 28 are positioned at a lower half of the door 12, i.e., at a distance from the floor 26 of less than 50% of a height of the door along the vertical axis Z. The first rail 28 is for example positioned at less than 20 cm from the floor 26.

The first carriage 34 is able to slide along the first rail 28, so as to guide the sliding of the door 12 relative to the panel 14. The sliding means of the carriage 34 along the rail 28 will be outlined in more detail below.

Figure 2:
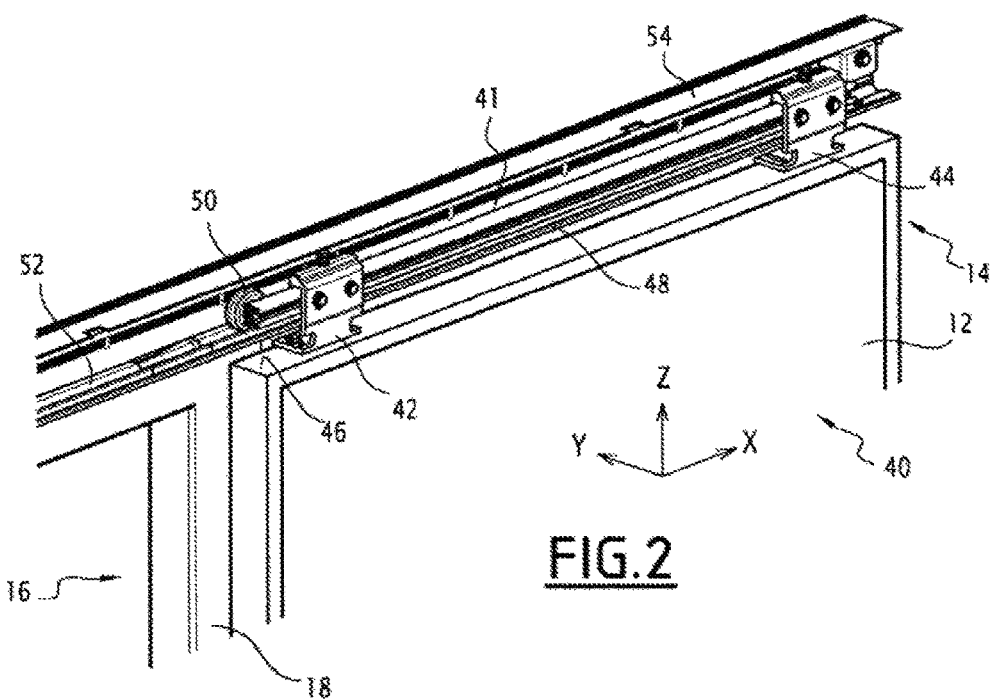
FIG. 2 is a partial perspective view of the assembly of FIG. 1, this view showing the door and the translation device.
Figure 3:
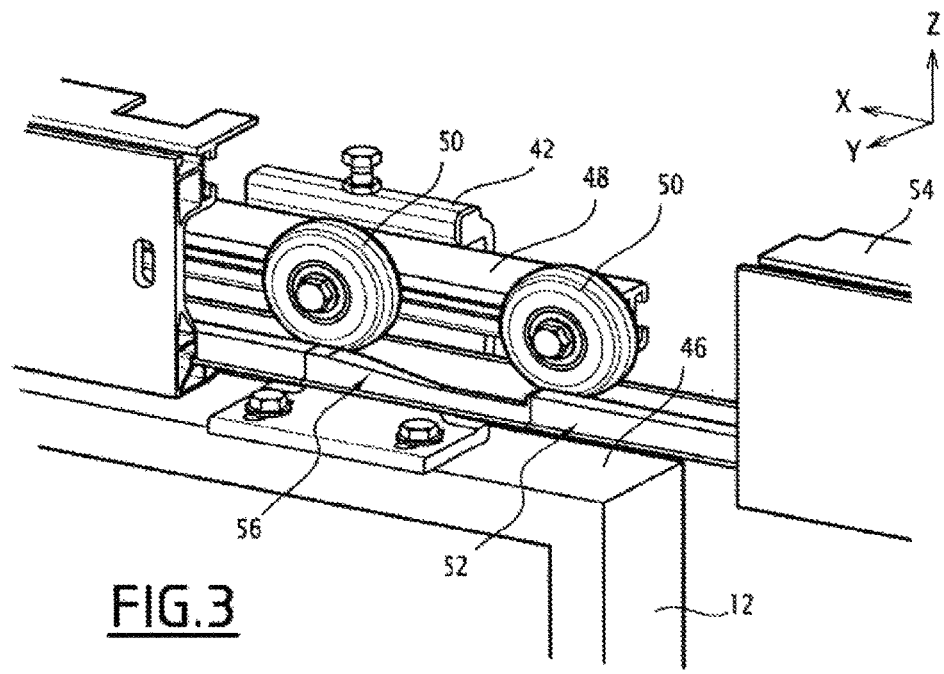
FIG. 3 is a detail view, in partial section, of the translation device of FIG. 2.

The guide 27 is designed to guide the bottom of the door 12 during the movement of said door 12 by sliding, between open and closed positions. The assembly 10 further comprises a translation device 40 connected to another part of the door 12. The translation device 40, shown in FIGS. 2 and 3, is known from the state of the art, in particular from document FR 2,936,005 A1.

The translation device 40 includes a second carriage 41, comprising two hooks 42, 44 fastened on an upper segment 46 of the door 12. The two hooks 42, 44 are connected by a beam 48 positioned parallel to the longitudinal axis X. Rollers 50 are mounted at the ends of the beam 48. The rollers 50 are able to roll on a roll band 52 of a second rail 54, fastened to the panel 14 above the opening 16. The second rail 54 is positioned parallel to the longitudinal axis X.

Preferably, the translation device 40 includes a motor (not shown) that drives the movement of the door 12 along the longitudinal axis X. The presence of the translation device 40 at the top of the door, jointly with that of the guide 27 at the bottom of the door, allows a better distribution of forces and friction between the bottom and top of the door 12.

The roll band 52 defines a trajectory, the majority of which is straight, parallel to the longitudinal axis X. However, at the positions of the rollers 50 in the closed position of the door 12, the roll band 52 includes ramps 56. A ramp 56 is in particular shown in FIG. 3 by a partial sectional view of the second rail 54.

The ramp 56 defines an oblique trajectory relative to the longitudinal axis X. More specifically, going from the closed position to an open position of the door 12, the movement of the rollers 50 on the ramps 56 leads to an elevation of said rollers 50 along the vertical axis, as well as a separation of said rollers 50 relative to the panel 14 along the transverse axis Y. "Open position" refers to a position of the door 12 in which the opening 16 is at least partially accessible.

Figure 4:
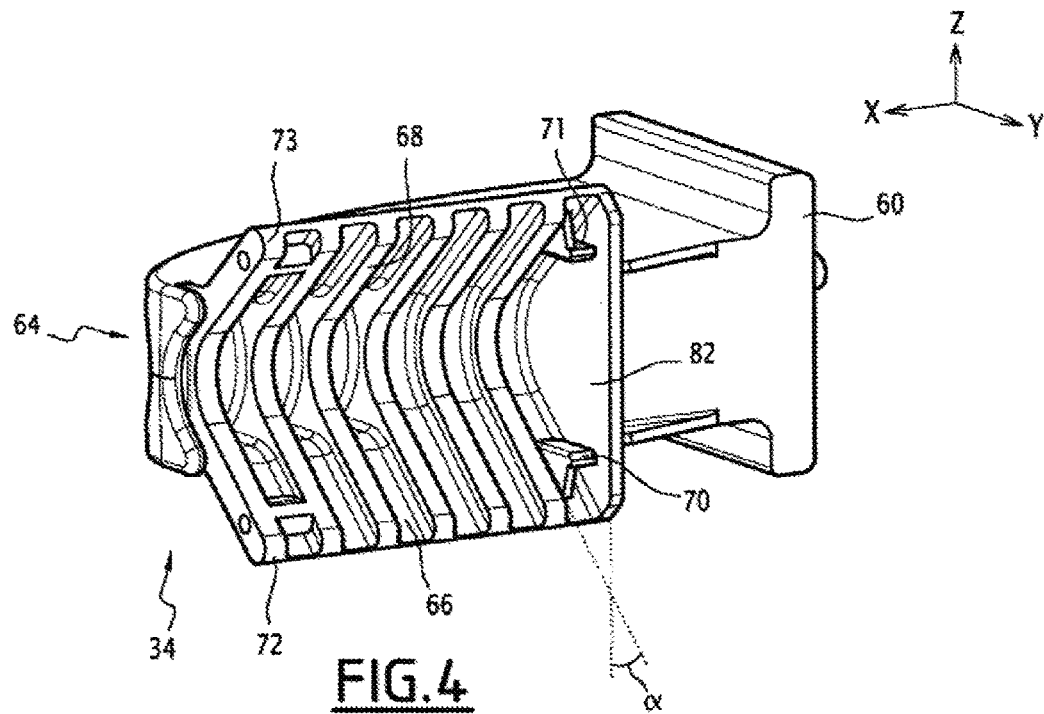
FIGS. 4 and 5 are perspective detailed views of the guide of FIG. 1.

FIG. 4 shows a detailed view of the first carriage 34 of FIG. 1. The carriage 34 includes a base 60 connected to the lateral segment 35 of the door 12, as shown in FIG. 1. The lateral segment 35 is substantially positioned in a plane perpendicular to the longitudinal axis X.

In the example of FIG. 1, the lateral segment 35 receiving the carriage 34 is located to the right of the door 12. However, the carriage 34 has a plane of symmetry parallel to (X, Y). Thus, in an alternative configuration of the guide 27, the carriage 34 as described below is fastened to the left of the door 12.

The base 60 is secured to a guide 64, positioned on the longitudinal axis X and including two walls 66, 68, symmetrical relative to the plane (X, Y). The walls 66, 68 are substantially planar or slotted, as in FIG. 4, so as to have planar bearing surfaces.

The walls 66, 68 are inclined by an angle α relative to the vertical axis Z. The angle α is between 30° and 60°. Preferably, the angle α is close to 45°, i.e., equal to 45°±5°. The incline of the walls 66, 68 implies that a cross-section of the guide 64 is substantially in the shape of a sideways V. A flare of the V is oriented toward the panel 14.

According to one preferred embodiment, each of the walls 66, 68 bears a latch 70, 71 extending substantially along the transverse axis Y, toward the panel 14. The latches 70, 71 are preferably close to the longitudinal edges 72, 73 of the walls 66, 68. In the example of FIG. 4, the latches 70, 71, which are symmetrical relative to (X, Y), are positioned close to one end of the guide 64 along the longitudinal axis X.

The guide 64 is made from plastic material such as a polyamide or a polyethylene, so as to have a satisfactory compromise between rigidity and elastic deformability.

Figure 5:
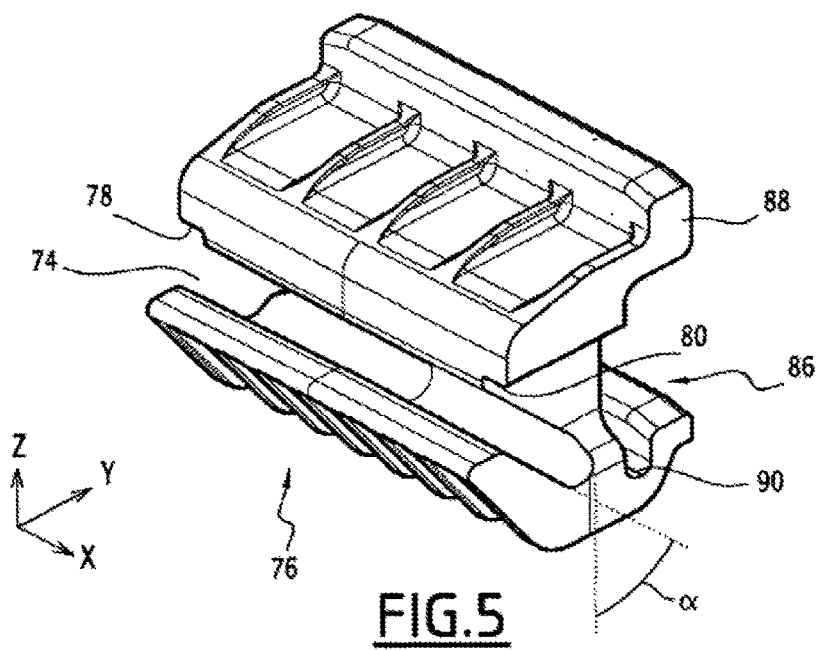
Figure 9:
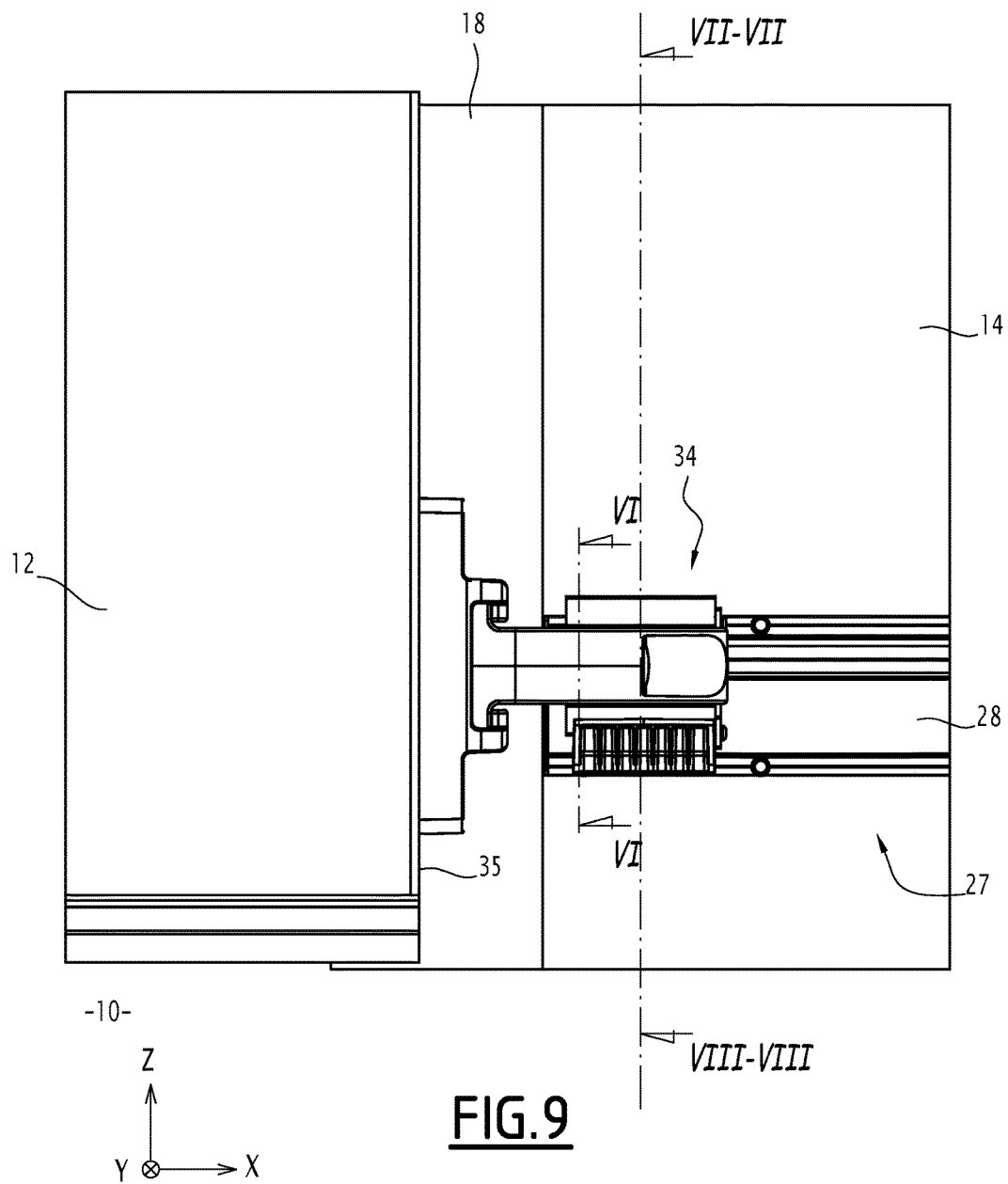
FIG. 9 is a front view of the assembly of FIG. 1, with cut-through lines VI-VI, VII-VII and VIII-VIII, showing the sections corresponding to FIGS. 6, 7 and 8 respectively, in accordance with an embodiment of the present invention.

The lowest wall 66 is engaged in a slot 74 arranged in a pad 76, said pad being shown in FIG. 5. The slot 74 has a shape complementary to that of the wall 66. More specifically, the slot 74 is substantially positioned in a plane parallel to the longitudinal axis X and inclined by an angle α relative to the vertical axis Z, the angle α being as defined above.

According to the preferred embodiment above, the pad 76 includes a first notch 78 able to fit elastically with the latch 70 when the wall 66 is partially engaged in the slot 74. On the opposite side along the longitudinal axis X, the pad 76 includes a second notch 80, symmetrical with the first notch 78 relative to (Y, Z). The second notch 80 is designed to fit elastically with the latch 71 of the wall 68 if the guide 27 is mounted in the other configuration, with the carriage 34 to the left of the door 12.

At one end along the longitudinal axis X, the guide 64 has a first axial stop 82, substantially positioned along (Y, Z). As shown in FIG. 1, a hood 84 is fastened to the guide 64 to form a second stop, opposite the first stop 82. The axial stops 82, 84 prevent the wall 66 from leaving the slot 74 by sliding along the longitudinal axis X.

On the side opposite the slot 74 relative to (X, Z), the pad 76 has a cavity 86, positioned along the longitudinal axis X and with a substantially U-shaped cross-section. The cavity 86 has a shape complementary to that of the first rail 28. The pad 76 is designed to fit on, and slide along, the rail 28 in the longitudinal axis X. Stops 88, 90, situated at the longitudinal edges of the cavity 86, prevent a separation between the pad 76 and the rail 28 by traction along the transverse Y and vertical Z axes.

The pad 76 is preferably made from polyoxymethylene (POM), characterized by a low friction coefficient. Alternatively, the pad 76 made from another plastic material, such as a polypropylene or a polyamide able to damp impacts.

Preferably, the guide 64 and the pad 76 are made from different materials to facilitate their sliding relative to one another.

A first operating method of the assembly 10 will now be described. It is considered that the door 12 is open and in the process of sliding relative to the panel 14 toward its closed position. The wall 66 of the guide 64 is then partially engaged in the slot 74 of the pad, as shown in FIG. 7. More specifically, the longitudinal edge 72 of the wall 66 is separated from a bottom 94 of the slot 74.

In a first considered case, the door 12 undergoes a slight thrust along the transverse axis Y in the direction going from the panel 14 toward the door 12. The wall 66 and the slot 74 being inclined relative to the transverse axis Y, the friction between said door 66 and said slot 74 suffices to prevent the separation of the guide 64 and the pad 76.

In case of slightly greater impact in the same direction, the energy absorbed by the door 12 leads to a slight elastic deformation of the guide 64 and/or the pad 76. The energy also causes slight pivoting of the door 12 around an axis parallel to and substantially situated at the beam 48 or the second rail 54. Such pivoting is allowed, to a certain extent, by play between the different elements of the translation device 40.

Said pivoting of the door 12, associated with the elastic deformation of the guide 64 and/or the pad 76, results in rising of the door 66 along the slope formed by the slot 74.

In the event the guide 64 does not include a latch 70, 71, the energy of a relatively small impact may suffice to cause the slot 74 to leave the longitudinal edge 72 of the wall 66. The carriage 34 is then separated from the pad 76, which itself is maintained on the rail 28 by the stops 88, 90. The energy of the experienced impact has been dissipated by elastic deformation, without deterioration of the parts of the guide 27. To return the assembly 10 to its operating state, it then suffices to raise the guide 64 on the pad 76.

In the event the guide 64 includes a latch 70, the rising of the door 66 along the slope brings the latch 70 into contact with lips 96, 98 of the slot, as shown in FIG. 6 in a cross-section at the notch 78.

In the case of a moderate impact, the lips 96, 98 keep the latch 70 inside the slot 74 and prevent the separation of the guide 64 from the pad 76. In the event of a greater impact, the elastic deformation of the pad 76 leads to the separation of the lips 96, 98 and the ejection of the latch 70. The carriage 34 is then separated from the pad 76.

The presence or absence of a latch 70 therefore makes it possible to modulate the impact energy necessary to separate the carriage 34 and the pad 76. The same is true for the value of the angle α and the depth of the slot 74.

The guide 27 makes it possible to dissipate the energy from the greatest frontal impact in the door 12, by separating the carriage 34 and the pad 76. The assemblies of the pad 76 with the first rail 28, the first rail with the panel 14, and the carriage 34 with the door 12 therefore do not risk being torn or destroyed by the impact.

In the case of weaker impacts that do not risk damaging the guide 27, the guide 64 is retained in the slot 74 of the pad and the door 12 is kept in place.

The use of an intermediate pad 76 makes it possible to separate the deformable stop in case of impact on the one hand, formed by the wall 66 and the slot 74, and the part sliding on the first rail 28 on the other hand, formed by the cavity 86. According to one alternative of the invention, the guide 27 does not include a pad 76 and the rail 28 includes a surface similar to the slot 74, cooperating with a surface of the carriage 34 for separation in case of a significant impact. However, this alternative requires giving the rail 28 a more complex shape that is also bulkier along the transverse axis Y.

Alternatively, the stop formed by the wall 66 and the slot 74 has alternative shapes. The guide 64 for example includes a cylindrical bead positioned along the longitudinal axis X, gripped between lips supported by the pad 76. An impact along the transverse axis Y elastically deforms the lips, then releasing the bead.

The guide 27 as described above also has the advantage of improving the guiding of the door 12 toward its closed position. It is considered that the guide 64 is mounted on the pad 76, as in FIG. 7, and the door 12 arrives near its closing position. The rollers 50 of the second guide 40 engage on the ramps 56 of the second rail 54. The door 12 continuing its movement along the longitudinal axis X, the rollers 50 come close to the panel 14 along the transverse axis Y, as well as the floor 26 along the vertical axis Z. The door 12 therefore has an oblique trajectory in the plane (Y, Z).

This oblique trajectory is accompanied by lowering of the wall 66 of the carriage 34, along the slope formed by the slot 74. When the rollers 50 move on the ramps 56 toward the closed position of the door 12, the longitudinal edge 72 of the wall 66 comes closer to the bottom 94 of the slot 74. In the closed position, the edge 72 is for example in contact with the bottom 94, as shown in FIG. 8.

The movement of the carriage 34 relative to the pad 76 therefore accompanies the movement of the bottom of the door 12 toward its closed position, which contributes to properly pressing the seals 20, 22 against the doorframe 18 and the floor 26 during closing of the door 12.

Preferably, the oblique trajectory of the door 12 in the plane (Y, Z), defined by the ramps 56, corresponds to a slope with an angle substantially equal to the angle α as defined above.

In the event the trajectory defined by the ramps 56 has a slope slightly different from the angle α, the wall 66 cooperates with the slot 74 to create a cam effect, straightening the trajectory of the bottom of the door.

The guide 27 makes it possible to limit or avoid deterioration of the assembly 10 in case of frontal impact on the door 12, and to improve the tightness of the door in the closed position.

The invention claimed is:

1. A guide for a sliding door, comprising:
   a rail fastened against a vertical panel, the rail extending along a longitudinal axis;
   a pad fitted in said rail and able to slide along said rail, the pad comprising a first stop part; and
   a carriage fastened to a sliding door, the carriage comprising a connecting portion, connecting the carriage to said pad so as to allow sliding of the carriage and said pad together along said rail, the connecting portion comprising a second stop part,
   wherein said first and second stop parts are formed by respective first and second abutting surfaces that are each inclined relative to the vertical panel by an angle between 30° and 60°, the first abutting surface being part of said pad and the second abutting surface being part of said connecting portion of said carriage,
   wherein said first and second stop parts oppose movement of said carriage relative to said rail in a direction perpendicular to the longitudinal axis,
   wherein under a first force applied in a direction perpendicular to the longitudinal axis, at least one of said first and second stop parts deform elastically so as to allow a separation between said carriage and said rail, and
   wherein under a second force less than the first force, applied perpendicular to the longitudinal axis, the first and second abutting surfaces slide against one another perpendicular to the longitudinal axis, while being retained in contact with each other, thereby preventing a separation between said carriage and said rail.

2. The guide according to claim 1, wherein the first and second abutting surfaces are each inclined relative to the vertical panel, by an angle of approximately 45°.

3. The guide according to claim 1, further comprising a latch supported by one of said connecting portion of said carriage or said pad, said latch being elastically fitted with a notch that is supported by the other of said pad and said connecting portion of said carriage, said latch or said notch deforming elastically under a third force applied substantially perpendicular to the longitudinal axis.

4. An assembly comprising:
   a substantially vertical sliding door; and
   a guide for said sliding door, comprising:
      a rail fastened against a vertical panel, the rail extending along a longitudinal axis;
      a pad fitted in said rail and able to slide along said rail, the pad comprising a first stop part; and a carriage fastened to a lower half of said sliding door, the carriage comprising a connecting portion, connecting the carriage to said pad, so as to allow sliding of the carriage and said pad together along said rail, the connecting portion comprising a second stop part, wherein said first and second stop parts are formed by respective first and second abutting surfaces that are each inclined relative to the vertical panel by an angle between 30° and 60°, the first abutting surface being part of said pad and the second abutting surface being part of said connecting portion of said carriage, wherein said first and second stop parts oppose movement of said carriage relative to said rail in a direction perpendicular to the longitudinal axis, wherein under a first force applied in a direction perpendicular to the longitudinal axis, at least one of said first and second stop parts deform elastically so as to allow a separation between said carriage and said rail, and wherein under a second force less than the first force, applied perpendicular to the longitudinal axis, the first and second abutting surfaces slide against one another perpendicular to the longitudinal axis, while being retained in contact with each other, thereby preventing a separation between said carriage and said rail.

5. The assembly according to claim 4, further comprising a translation device for said sliding door, the translation device connected to an upper part of said sliding door and comprising:

a second rail fastened against the vertical panel and comprising a roll band; and a second carriage fastened to said sliding door comprising a sliding device for sliding along said second rail, said sliding device comprising rollers that roll on said roll band of said second rail.

6. The assembly according to claim 5, wherein said translation device defines a trajectory of said sliding door between a closed position and an open position, such that said sliding door is closer to the vertical panel or lower, relative to a floor adjacent to the vertical panel, in the closed position than in the open position.

* * * * *